(12) United States Patent
St. Clair (10) Patent No.: US 9,402,026 B2
(45) Date of Patent: Jul. 26, 2016

(54) SPHERICAL PANORAMIC IMAGE CAMERA RIG

(71) Applicant: Patrick A. St. Clair, Henrietta, NY (US)

(72) Inventor: Patrick A. St. Clair, Henrietta, NY (US)

(73) Assignee: Circular Logic Systems, Inc., Henrietta, NY (US)

( * ) Notice: Subject to any disclaimer, the term of this patent is extended or adjusted under 35 U.S.C. 154(b) by 286 days.

(21) Appl. No.: 14/147,529

(22) Filed: Jan. 4, 2014

(65) Prior Publication Data

US 2014/0192144 A1 Jul. 10, 2014

Related U.S. Application Data

(60) Provisional application No. 61/749,283, filed on Jan. 5, 2013.

(51) Int. Cl.
*H04N 5/232* (2006.01)
*H04N 5/225* (2006.01)

(52) U.S. Cl.
CPC ......... *H04N 5/23238* (2013.01); *H04N 5/2251* (2013.01)

(58) Field of Classification Search
CPC .......................... H04N 5/2251; H04N 5/23238
USPC ............................................................ 348/36
See application file for complete search history.

(56) References Cited

U.S. PATENT DOCUMENTS

| 5,130,794 A * | 7/1992 | Ritchey ..................... F41G 7/30 348/383 |
| 9,152,019 B2 * | 10/2015 | Kintner ................. G03B 17/561 |
| 2007/0182812 A1 * | 8/2007 | Ritchey ................ H04N 5/2254 348/36 |
| 2014/0153916 A1 * | 6/2014 | Kintner ................. G03B 17/561 396/419 |

* cited by examiner

*Primary Examiner* — Behrooz Senfi
(74) *Attorney, Agent, or Firm* — Tracy Jong Law Firm; Tracy P. Jong; Cheng Ning Jong (57) ABSTRACT

One aspect of the present invention provides a simple, cost-effective, efficient solution directed to the generation of the source material for the generation of still panoramic images. The precision optical alignment among all the mounted lenses, provided by the precision rectangular mounting rig, greatly reduces or eliminates stitching errors. Stitching errors often result in noticeable defects in the final image which will require human technical assistance to remedy (if the defect is of the repairable type). Accurate, error-free, source material enables virtually full automation of the panoramic imaging process; wherein the end product is high quality and quickly achieved.

18 Claims, 7 Drawing Sheets

SPHERICAL PANORAMIC IMAGE CAMERA RIG

PRIORITY CLAIM AND RELATED APPLICATIONS

This non-provisional application claims the benefit of priority from provisional application U.S. Ser. No. 61/749,283 filed on Jan. 5, 2013. Said application is incorporated by reference in its entirety.

BACKGROUND OF THE INVENTION

1. The Field of the Invention

The present invention relates to the field of still image photography. In particular, the present invention discloses a spherical panoramic image camera rig adapted to accommodate a plurality of predetermined cameras where the rig captures a 360 degree spherical panoramic image. Using the spherical panoramic image camera rig, four cameras are precisely mounted for optimal spherical panoramic image capturing for environments with continual movement. Advanced and automated image processing of the captured images is enabled.

2. Background Art

At the present time, there are some known camera outfits and methods of creating 360 degree spherical panoramic images. However, most current systems are subject to limitations due to their physical size, weight, mechanical complexity, and arbitrary optical alignments. Additionally, the prior art systems utilize five or more cameras to produce the spherical panoramic images. This is not only expensive in equipment costs, stitching of the images is also complex and incapable of producing satisfactory images.

Some panoramic systems involve spinning a single camera to capture a panoramic view in a sweeping type motion while holding the shutter open. Others sequence a series of overlapping still images taken at periodic intervals as the camera is rotated on a tripod about a vertical axis. These still images are then introduced into a semi-automated software program called a "stitcher" that merges the overlapping still images into a single panoramic strip. The stitching process, in the aforementioned context, suffers from a number of shortcomings. The recommended process is prone to temporal artifacts since it captures each individual photo at a different time. As a result, the "stitched" pan image is not instantaneous but rather is made up of individual photos taken at different times and from different perspectives. This severely limits the usability of panoramic imagery in fluid situations. The time change during the series of images makes it nearly impossible to create panoramic images in environments where the scene is continuously changing (e.g. ocean shots, sports action, photo journalism, moving crowds, and the like).

With few exceptions, the prior art multi-camera panoramic outfits that simultaneously capture the required images greatly suffer from imprecise optical alignments, poor imaging control, and questionable optical quality. Such shortcomings often result in stitching artifacts or blemishes that mar the final panoramic product. Sometimes the blemishes can be repaired via human intervention, however, such repairs tend to be labor intensive and detract from the trend toward automation and low cost. Additionally, most existing systems are optimized for video, whereas the present invention is optimized for still 360-degree spherical panoramic professional photography.

SUMMARY OF THE INVENTION

The present invention discloses a camera rig for 360-degree spherical panoramic imaging that instantaneously captures four images via four cameras to create high quality, accurate image files or source material to enable the creation of a 360-degree spherical panoramic image. The creation of the final panoramic image is accomplished by an appropriate stitching computer program that blends the four individually captured images into a single image. The simultaneous image capture and minimization of parallax issues facilitates images that can be stitched automatically by software, allowing cost and time effective processing of the panoramic images.

Disclosed herein is a spherical image camera rig comprising four rectangularly disposed receptacles. Each receptacle is configured to receive a camera having a fisheye lens disposed thereon. Two of the four receptacles are configured to receive two cameras in a first 180-degree linear alignment with directly opposing lenses, the other two of which are configured to receive two cameras in a second 180-degree linear alignment with directly opposing lenses. The second 180-degree linear alignment is configured to intersect perpendicularly with the first 180-degree linear alignment.

In one embodiment, each of the four rectangularly disposed receptacles comprises a planar surface having a plurality of first apertures and a U-shaped member comprising an adjustment slot within which a screw mechanism is disposed. The adjustment slot is configured for adjustment of the screw mechanism in securing a camera. There is further provided a plurality of second apertures configured for receiving screws which thread through the plurality of first apertures for securing the U-shaped member to the planar surface.

In another embodiment, each of the four rectangularly disposed receptacles comprises a planar surface and a protrusion extending from the surface. The protrusion comprises an adjustment slot within which a screw mechanism is disposed. The adjustment slot is configured for adjustment of the screw mechanism in securing a camera.

In one embodiment, each of the plurality of fisheye lenses possesses vertical, horizontal and diagonal angles of view of at least about 170 degrees.

In one embodiment, the overlap of images captured using the cameras is at least 10% of the total captured image area of the cameras.

In one embodiment, the present rig comprises a single power source operably connected to the cameras.

In one embodiment, the single power source comprises a battery.

In one embodiment, the present rig further comprises a harness for connecting the power source of each of the cameras in parallel.

In one embodiment, the present rig further comprising a plurality of isolated triggers with each trigger functionally connected to one of the cameras.

In one embodiment, suitable isolated triggers can be an opto-coupler or an opto-coupler.

In one embodiment, the rig further comprises a remote triggering mechanism configured to trigger image capture of the cameras.

In one embodiment, the remote triggering mechanism is a wireless triggering device.

In one embodiment, the rig further comprises a triggering mechanism configured for triggering image capture of the cameras at precisely the same moment.

In one embodiment, the four rectangularly disposed receptacles are sized such that the distance between the nodes of two cameras disposed in a 180-degree linear alignment with directly opposing lenses is more than about 10 inches. In another embodiment, this distance is less than about 4 inches.

Accordingly, it is an object of the present invention to provide a relatively inexpensive, simple, precision mounting rig adapted to accommodate four mirror-less interchangeable-lens camera (MILC) type cameras.

It is yet another object of the present invention to provide a precision mounting rig with particular cameras or groups of cameras based on the size of the camera body. The goal is to provide the tightest or most compact cluster camera arrangement possible, thereby producing the smallest Panoramic Effective Radius (PER).

Accordingly, it is an object of the present invention to provide a relatively inexpensive, simple, precision camera rig for 360-degree spherical panoramic image capture.

It is yet another object of this invention to provide a relatively simple device that is economical from the viewpoint of the manufacturer and consumer, is susceptible to low manufacturing costs with regard to labor and materials, and which accordingly evokes low prices for the consuming public, thereby making it economically available to the buying public.

Whereas there may be many embodiments of the present invention, each embodiment may meet one or more of the foregoing recited objects in any combination. It is not intended that each embodiment will necessarily meet each objective.

Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

In this respect, before explaining at least one embodiment of the invention in detail, it is to be understood that the invention is not limited in its application to the details of construction and the arrangements of the components set forth in the following description or illustrated in the drawings. The present invention is capable of other embodiments and of being practiced and carried out in various ways. Also it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent construction insofar as they do not depart from the spirit and scope of the conception regarded as the present invention.

Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

PARTS LIST

2—camera rig
4—rectangular tubular frame
6—center channel
8—aperture
10—base plate
12—U-shaped member
14—adjustment slot on camera mounting plate
16—camera
18—geometric center of rectangular tubular frame
20—node
22—nodal reference circle
24—lens reference circle
26—camera lens barrel
28—lens reference point
30—fisheye lens
32—isolator
34—single power source
36—electronic triggering mechanism
38—cable harness
40—width of frame
42—height of frame
44—adjustment slot on leg of U-shaped member
46—depressed portion
48—camera mounting plate
50—view perspective for viewing data-backs of cameras
52—first linear alignment
54—second linear alignment
56—individual power source of one camera
58—input port of isolator
60—output port of isolator
62—transmitter operably connected to electronic triggering mechanism
64—receiver operably connected to isolator
66—planar surface of U-shaped member

PARTICULAR ADVANTAGES OF THE INVENTION

The present invention discloses a camera rig for 360-degree spherical panoramic imaging that instantaneously and simultaneously captures four images via four high quality cameras to create high quality, accurate image files or source material to enable the creation of a high resolution, high quality 360-degree spherical panoramic image. The ability to mount any camera allows a professional photographer to have full control over the artistic and technical aspects of the image capture—lighting, shutter speed, lens and filter selection, and the like—allowing the production of the high resolution professional quality imaging that is not possible with existing systems.

The nature of this four camera design, its rigidity, and the precision that goes into its manufacturing and factory alignment is the key to its effectiveness and repeatability, all in a compact, lightweight camera rig. The present invention provides a simple, cost-effective, efficient solution directed to the generation of the source material for the generation of still 360-degree spherical panoramic images. The ruggedness of the design enables confident, secure mounting on aerial platforms, such as mounting points on a helicopter.

The four cameras are mounted together on the camera rig in a configuration that is compact and the lenses are aligned in a manner that creates sufficient image overlap for automated "stitch" processing of the four individual images into a final panoramic image. The precise positioning of four fisheye lenses at 90 degrees apart in the same plane allows a quality 360-degree spherical panoramic image to be produced from only four source images rather than the five to seven source images in prior art systems. The fisheye lenses capture images with sufficient overlap that the ceiling and floor can be captured, providing a full 360 degree spherical still view of the space.

The simultaneous image capture, overlap of the images captures of at least 10% and preferably at least 30% of the total captured image area, and minimization of parallax issues facilitates images that can be stitched automatically. Stitching errors often result in noticeable defects in the final image which will require human technical assistance to remedy (if the defect is of the repairable type). Accurate, error-free, source material enables virtually full automation of the panoramic imaging process wherein the end product is high quality and quickly achieved.

Simultaneous activation of each of the four cameras, enabling all four images to be captured at the same moment in time, allowing a quality 360-degree spherical panoramic image to be produced in environments where there is a significant amount of movement. Examples include sporting events, trade shows and other environments with large crowds of people moving in real time. The simultaneous actuation of the plurality of cameras allows images to be captured at the same moment in time and perspective, thereby enabling automated stitching of the images because manual perspective corrective action is unnecessary.

There is further provided a radio frequency (RF) receiver which facilitates remote simultaneous activation of each of the four cameras, enabling all four images to be captured without capturing the photographer in the captured images, allowing a quality panoramic image to be produced. Because all cameras fire simultaneously, high resolution, spherical, full action 360-degree views are enabled in the marketplace for the first time. The electronic trigger may include a feedback loop that signals visually that all cameras did indeed fire.

As the image files captured by the spherical panoramic image camera rig (source material) are of the high quality and accurate, the resulting stitched four equirectangular image files can be utilized in a variety of ways. The source material and/or spherical panoramic image can serve to produce additional forms of media, including, but not limited to 360-degree interactive panoramic images, perspective corrected prints (processing via appropriate software) and High Definition (HD) programmed video output (processing via appropriate software). Present day systems tend to focus on just one media form, whereas the present invention provides the user with a more versatile media palette. This full 360-degree spherical panoramic image, including the floor and ceiling in the image, expands the usable image further than traditional panoramic images, allowing them to be used to display more information and data in graphic form. Combining the graphic images with additional data about the subject matter depicted in the images enhances the ability to convey information in an intuitive and easy to comprehend manner. By way of example, a trade show image can depict products on display and additional data about each product can be linked to the image and be available at a simple click, touch or hovering over the (hyperlinked) object of interest in the image. By way of further example, a crime scene can be captured and recorded before anything has been done to change the scene during police processing and evidence collection. A yet further example is mapping of building interiors to work with databases containing information about facilities such as utility infrastructure, heat, ventilation and Air Conditioning (HVAC) systems and other structural feature data that can be valuable in an emergency situation.

As the rig is constructed with precision calibration and templatization, and the camera mounting plates are mounted and precision aligned at the factory. Each rig can be customer specific and built/assembled to order, that is, to accommodate the camera of choice for the user. In one example, the camera mounting plates are milled out of solid aluminum blocks so there will be no welds in their fabrication. Because of the precision in the rig's construction, software templates can be created to automate the stitching process. Off the shelf commercially available stitching software such as "PTGUI" and "KOLORs®" "AutoPano® Pro Giga" can suitably be adapted for use with this rig.

DETAILED DESCRIPTION OF A PREFERRED EMBODIMENT

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

With reference to the drawings of the present invention, several embodiments pertaining to the image capture system and method of use thereof will be described. In describing the embodiments illustrated in the drawings, specific terminology will be used for the sake of clarity. However, the invention is not intended to be limited to the specific terms so selected, and it is to be understood that each specific term includes all technical equivalents that operate in a similar manner to accomplish a similar purpose. Terminology of similar import other than the words specifically mentioned above likewise is to be considered as being used for purposes of convenience rather than in any limiting sense.

It must be noted that as used herein and in the appended claims, the singular forms "a", "an", and "the" include plural reference unless the context clearly dictates otherwise. As well, the terms "a" (or "an"), "one or more" and "at least one" can be used interchangeably herein. It is also to be noted that the terms "comprising", "including", "characterized by", "possessing" and "having" can be used interchangeably.

The spherical panoramic image camera rig ("rig") comprises a frame adapted to mount four image capture devices 16. In one embodiment, the image capture devices are conventional digital cameras. Preferably, the digital cameras are professional grade cameras as opposed to "point and shoot" (or "point and click") models aimed at the amateur photographer consumer. However, in other embodiments, the image capture devices comprise tablets, smart phones, video recorders and other devices containing image capture capabilities. For simplicity in understanding the invention, the term "camera" should be understood to include all such image capture devices that currently exist or are developed as technology improves over time. In another embodiment, the image capture devices are conventional film cameras capable of producing images which can be converted into digital format that can be manipulated or stitched.

Figure 1:
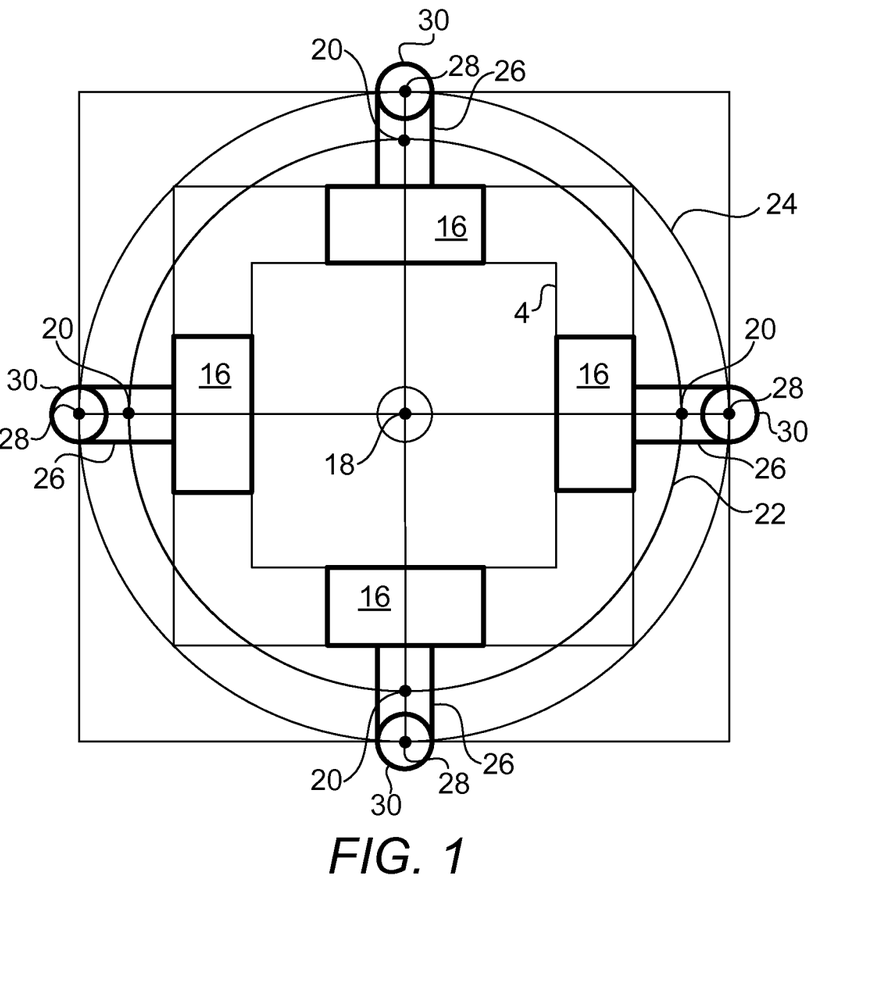
FIG. 1 is a top view of an exemplary panoramic imaging system.

FIG. 1 is a top view of an exemplary panoramic imaging system. The view is intended to provide the optical relationships among the system components, clearly depicting one embodiment of the present invention. In order to obtain workable images, it is imperative the placement of each camera and hence the node 20 of each camera to be as close to the geometric center 18 of the rectangular tubular frame 4 as possible.

The rig is designed to position the four cameras as close as possible to the geometric center 18 of the rectangular tubular frame 4 to enable the closest effective image capture distance from the subject. Spherical panoramic imaging of distant objects is well known in the art. There are still challenges encountered in capturing 360-degree spherical panoramic images of closer objects and small spaces. Other challenges are presented by environments with constant movement. The rig configuration enables all four cameras to be "along" the path of the common node of the lenses, and opposite pairs of cameras are precisely centered on one another for predictable and repeatable image capture with enough image overlap on the fringes of obtained individual images for effective stitching of the individual images into a single 360-degree spherical panoramic image.

Preferably, there are four identical cameras 16 attached to the camera rig, each camera comprising a fisheye lens 30. Cameras with compact camera bodies work best, and as such, mirrorless cameras are well suited to this application. In some aspects, different camera models can be used with the system if the camera dimensions and image quality of the captured images are sufficiently comparable for stitching into a quality 360-degree spherical panoramic image. While it will be possible to incorporate different camera mount plates designed to mount different cameras on each of the four sides of the rig, this is not anticipated to be advantageous because the image quality is likely to differ enough that the images will not be easy to stitch together into a final panoramic image.

The preferred cameras for the imaging system are the compact mirror-less interchangeable-lens camera (MILC) types that contain large sensor areas. Examples of cameras that are suitable for this purpose include the Sony NEX series (e.g. Sony NEX-5N) and the SAMSUNG NX1000/2000. Such cameras typically possess high resolution sensors while being compact in size.

Each of the four MILC type cameras is precisely mounted onto each side of the four sided precision rectangular tubular mounting rig via a simple fastener. A tight cluster camera arrangement is enabled with incorporation of the preferable compact nature of the cameras. This compact arrangement enables the imaging system to produce a small Panoramic Effective Radius (PER), defined as the distance from the imaging system to the point where spherical imaging can commence. For example, an imaging system with a PER of approximately ten inches, would have the capability to spherically image the passenger compartment of a typical automobile. With lenses disposed around a three inch circumference, the system is able to capture quality images as close as two feet from the lenses, making it ideal for use in building interiors and other small spaces. As will be readily appreciated, a wide range of lenses and housing sizes can be adapted to the present rig and are considered within the scope of the invention.

Figures 2, 3:
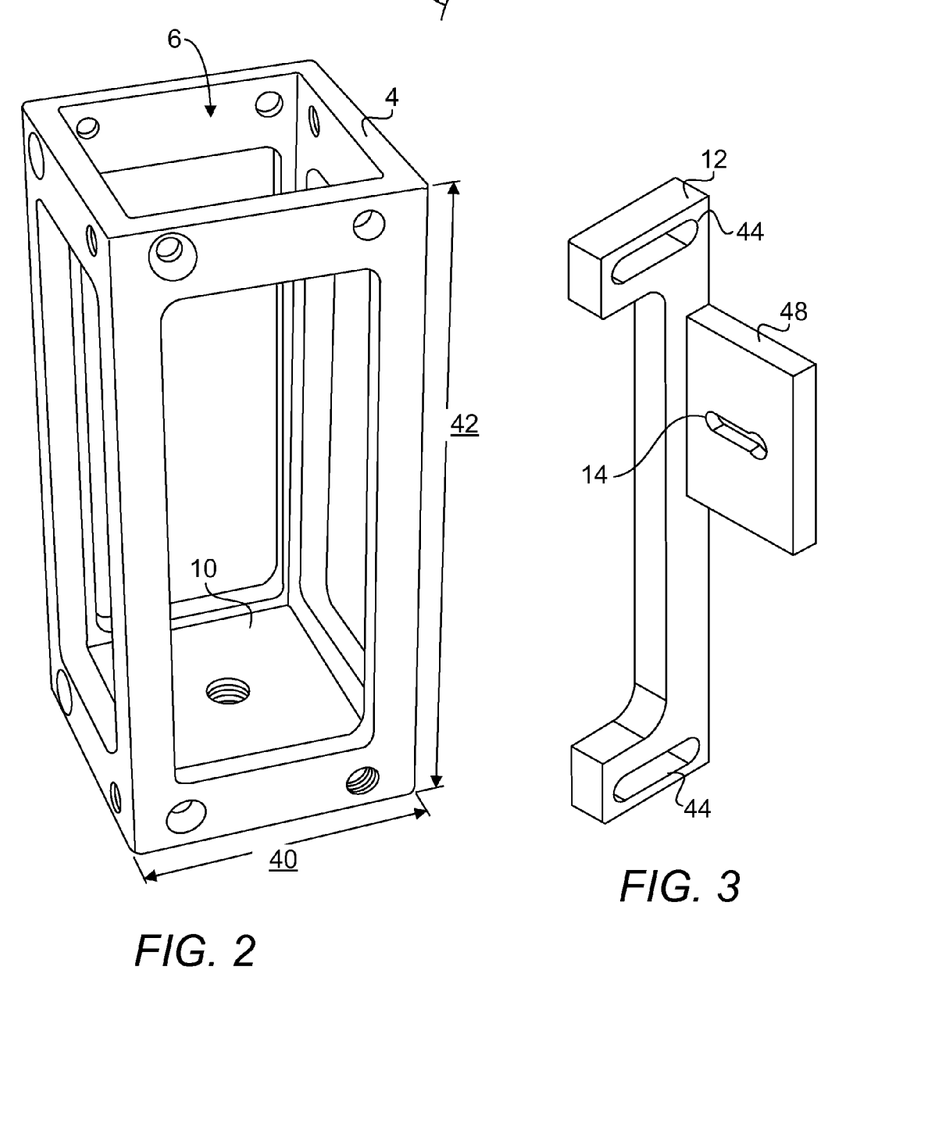
FIG. 2 is a perspective view of a present frame.
FIG. 3 is a perspective view of a U-shaped member configured to be mounted onto the frame of FIG. 2.

FIG. 2 is a perspective view of a rectangular tubular frame 4. The view window of the frame 4 as viewed from view perspective 50 allows the user to see and/or manually adjust settings on the data-backs of any of the mounted cameras. The rig includes a rectangular tubular frame surrounding a center channel 6. A base plate 10 encloses one end of the frame 4 and provides a centrally disposed threaded aperture that is used to mount the rig on a conventional tripod. Affixed to the frame are four U-shaped members 12. In one embodiment, an electronic triggering mechanism is disposed inside the center channel 6. The four camera mounting plates 48 are precision designed based upon the precise model of camera to be affixed to the rig. The manufacturing tolerance for this alignment is precise to within 1/1000 of an inch. In some aspects, this provides one precision platform that can accommodate all appropriately sized camera models.

FIG. 3 is a perspective view of a U-shaped member 12 configured to be mounted onto the frame of FIG. 2. All U-shaped members 12 for all four cameras in all four positions are identical. Each U-shaped member 12 further includes a camera mounting plate 48 disposed substantially perpendicularly to planar surfaces of the U-shaped member 12. Disposed within the camera mounting plate 48 is an adjustment slot 14. As will be disclosed elsewhere herein, a depressed portion 46 is further disposed about the adjustment slot 14 such that a ring screw may be accommodated within the depressed portion 46 while the ring screw is used to secure a camera through the adjustment slot 14. In preferred embodiments, the U-shaped members 12 are machined from one piece of metal (e.g. aluminum) to assure tight tolerances are achieved. In one embodiment, each of the four U-shaped members is formed from 3/8 inch thick aluminum and the camera mounting plate 48 is about 1.25 inches wide and 1 5/8 inches deep. Each U-shaped member has 1.0 inch adjustment slots 44 disposed at the top and bottom legs of the U-shaped member. One of the advantages of the rig is that it can be adapted to mount any desired camera body. The adjustment slots 44, 14 allow for precision alignment even where different camera models are used with the system.

Referring back to FIG. 2, the exemplary embodiment depicted of the rig accommodates cameras having a camera body up to and including 2.5 inches tall. In this embodiment, the frame 4 measures 5.75 inches tall (i.e., height 42 of frame) with a center channel 6 of 2.5 inches square (i.e., width 40 of frame=2.5 inches). The base plate 10 is a 2.0 inches square formed from 0.5 inch thick aluminum. At its center point is a 3/8 inch×16 threaded center hole that enables the camera rig to be mounted on a conventional tripod. As will be readily appreciated, the present rig may be configured in an array of dimensions to accommodate other camera styles and sizes. Optionally and additionally, the rig may include a 3/8"×16 to 1/4"×20 adapter to make it compatible with quick release plates using the 1/4"×20 standard thread.

The frame 4 is formed of a material having one or more of the following characteristics: lightweight, high mechanical strength and rigidity, dimensional stability, wide end-use temperature range, moisture resistance, electrical insulating characteristics and heat dissipating properties. The frame may be formed of sheets of 0.25 inch or 0.5 inch thick anodized aluminum. Preferably, the rig is formed from a solid aluminum block, eliminating the need for welding or other juncture unions between the component parts of the base frame. Welding or other means of attachment can compromise the precision placement of component parts or affect the weight balance of the system.

The rig can also be suitably constructed from a variety of stable, durable materials including metals, composites, or the like. In one embodiment, the frame is constructed of a thermoplastic polymer, acetal resin or other industrial polymeric material. In one embodiment, the frame and camera attachment plates are formed of polyoxymethylene, also known as acetal, polyacetal and polyformaldehyde. One commercially available product is DUPONT™ DELRIN® acetal homopolymer resin. Industrial thermoplastics and polymers offer a suitable alternative and can be designed to have specific properties. A suitable polymeric material would have one or more of the following characteristics: lightweight, high mechanical strength and rigidity, dimensional stability, wide end-use temperature range, moisture resistance, electrical insulating characteristics and heat dissipating properties. Molding the main portion of the frame as a single unit is not required, but has the advantage that it eliminates joints. The rig may also be 3D printed as a single unit or separate components comprising a frame 4 and four U-shaped members 12.

The cameras must have fisheye lenses that possess vertical, horizontal and diagonal angles of view of at least about 170 degrees. More preferably are lenses or combinations of lenses that possess vertical, horizontal and diagonal angles of view of at least about 185 degrees, with about 195 degrees being most desirable. Such lenses are able to capture a hemispherical image to enable the creation of a virtually complete spherical image. Although not required, for best results, identical lens should be used in all four positions on the rig. A 360-degree image can be captured via orienting the lenses for the most amount of overlap of the images captured by each individual fisheye lens. There is a positive correlation between the percentage of image overlap and resolution of the captured image. The amount of overlap is preferably in the range of about 10-30% of the total captured image area.

A circular fisheye lens or a full frame fisheye lens may be used, but the preferable lens is a full frame fisheye lens. The more overlap (also commonly referred to as the blend area) between the images, and the uniformity of image sharpness from edge to edge, the better the final 360-degree spherical panoramic image. Thus, a quality lens with greater than about 170-degree image capture range and uniform image sharpness across the entire image capture range will provide the best results. An 8 mm or less fisheye lens can be suitably adapted to this application, as well as many other lenses existing or designed for such use. Some lenses have provided image capture ranges greater than 180 degrees and these are some of the preferred lenses for use with the system. SamYang 7.5 mm circular fisheye works well with the rig (The Rokinon 7.5 mm fisheye lens has a 183-degree field of view). In some aspects, a combination of lenses is used to increase the image capture range, including one or more fisheye lenses or a combination of fisheye and peephole lenses.

Figure 4:
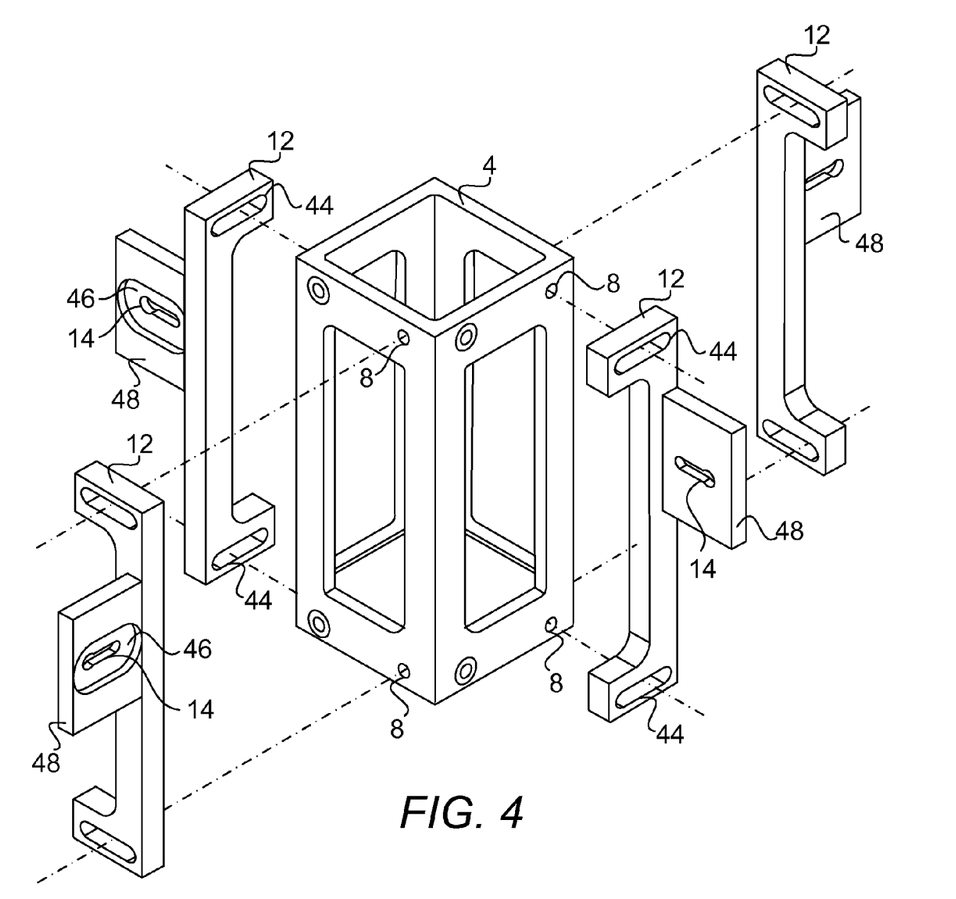
FIG. 4 is an exploded perspective view of one embodiment of the present camera rig depicting a rectangular tubular frame and the U-shaped members configured to be attached to the rectangular tubular frame.
Figure 5:
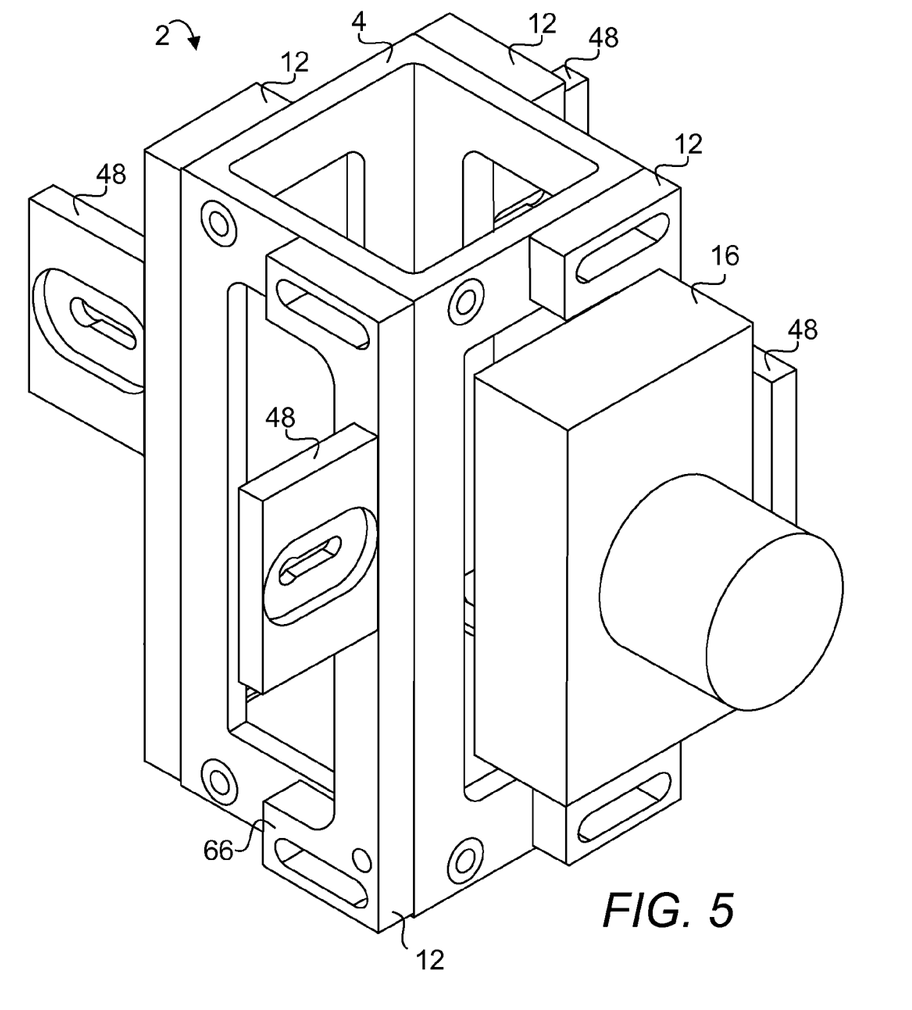
FIG. 5 is a perspective view of a rectangular mounting rig with camera mounting plates.

FIG. 4 is an exploded perspective view of one embodiment of the present camera rig 2 depicting a rectangular tubular frame and the U-shaped members 12 configured to be attached to the rectangular tubular frame 4. FIG. 5 is a perspective view of a precision rectangular mounting rig with U-shaped members 12 attached thereon (fasteners are not shown) forming four camera receptacles. Each receptacle is essentially a planar surface 66 having a perpendicularly disposed camera mounting plate 48. One of the camera mounting plates 48 is shown with a mounted camera 16 disposed thereon. In attaching a U-shaped member 12 to the frame 4, an adjustment slot 44 is aligned with an aperture 8 on the frame 4 before a fastening device, e.g., a screw, is inserted through the adjustment slot 44 and secured to the aperture 8 affixing the U-shaped member 12 to the frame 4. Similarly, a screw may be inserted through adjustment slot 14 such that a camera may be secured to the camera mounting plate 48. In one embodiment not shown, the frame and U-shaped members are formed integrally as a single unit. In this embodiment, each of the four rectangularly disposed receptacles comprises a planar surface and a protrusion extending from the surface. The protrusion comprises an adjustment slot 14 within which a screw mechanism is disposed where the adjustment slot 14 is configured for adjustment of the screw mechanism in securing a camera.

Figure 6:
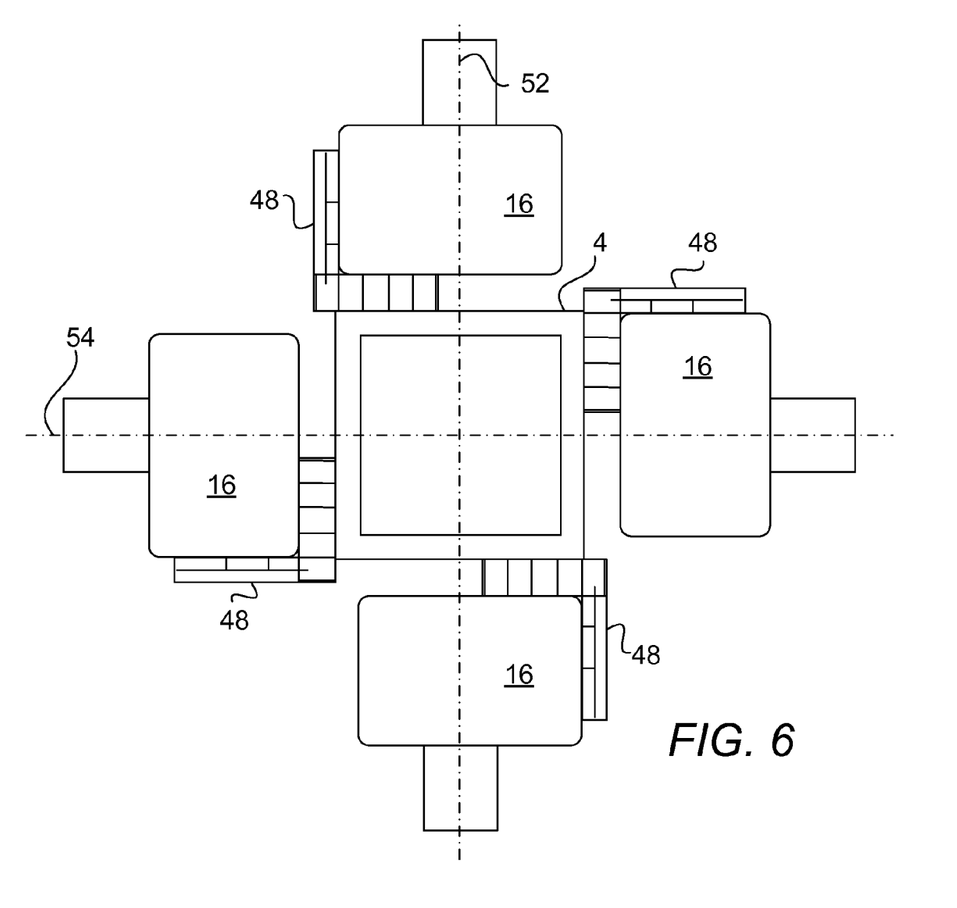
FIG. 6 is a top view of a precision rectangular mounting rig with all four U-shaped members attached thereon to form four receptacles and with each of the four receptacles having a camera disposed thereon.

FIG. 6 is a top view of a precision rectangular mounting rig with all four U-shaped members attached thereon to form four receptacles and with each of the receptacles having a camera disposed thereon. Two of the four receptacles are configured to receive two cameras in a first 180-degree linear alignment 52 with directly opposing lenses. The other two of the four receptacles is configured to receive two cameras in a second 180-degree linear alignment 54 with directly opposing lenses. The second 180-degree linear alignment is configured to intersect perpendicularly the first 180-degree linear alignment. In reality, the first or second 180-degree linear alignment may deviate from the precise 180-degree linear alignment. Such alignment may deviate by about 5 degrees from the 180-degree linear alignment, but preferably by only about 1 degree, however, an image can be adequately captured and stitched into a panorama. In a lesser preferred embodiment, an image can be adequately captured and stitched into a panorama with a deviation of 30 degrees from the 180-degree linear alignment. The linear alignments must, however, intersect, i.e., be coplanar. In one embodiment, two cameras are preferably mounted such that the distance between the nodes 20 of two cameras disposed in a 180-degree linear alignment with directly opposing lenses is no more than about 10 inches. If imaging of closer objects is desired, this distance may be as small as, or even no more than, about 4 inches.

As will be readily appreciated by those skilled in the art, parallax differences complicate the stitching process. Image processing software known as a stitcher corrects for viewpoint, however, it is limited in that it can either align the objects in the foreground or the objects in the background, but not both at the same time. Minimizing the distance between the lenses reduces parallax issues. Post image capture processing via software can accommodate for the error and distortion due to deviance from the true node. Misalignments are usually masked by retouching the stitched panorama during image processing.

Figure 7:
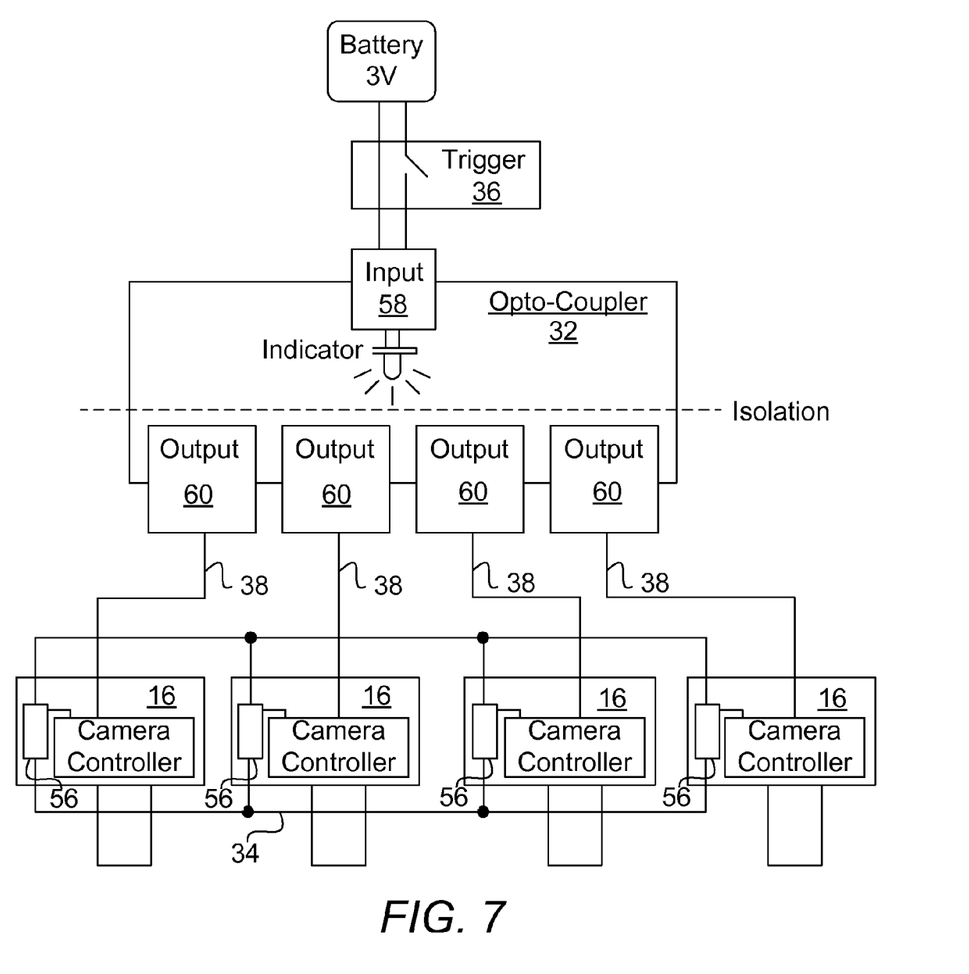
FIG. 7 is a block diagram depicting the use of a single power source to a plurality of cameras and an isolator to eliminate problems associated with unsynchronized capture of images of the plurality of cameras.

FIG. 7 is a block diagram depicting the use of a single power source to a plurality of cameras 16 and an isolator 32 to eliminate problems associated with unsynchronized capture of images of the plurality of cameras 16. In this embodiment, the rig includes a harness 38 for connecting individual power sources 56 in parallel to form a single power source 34. The rig further includes an electronic triggering mechanism 36. In one embodiment, the electronic triggering mechanism 36 receives its power from another source. In some aspects, a separate power supply is not required where the power is supplied by Universal Serial Bus (USB) power from a device equipped with such facility. The electronic triggering mechanism comprises an isolator 32. Suitable isolators include, but not limited to an opto-coupler or an opti-coupler. In one embodiment, the electronic triggering mechanism is hard wired or physically connected to the rig.

Another challenge in designing the present rig was to include a reliable remote activation feature. Since the advantage of this image capture system is that its four fisheye lenses capture a 360-degree spherical panoramic image, the photographer/user must be outside the image capture zone or he will be in the image. This is certainly undesirable for most commercial applications of the system and thus one embodiment includes a triggering mechanism is incorporated that works by radio frequency.

When photographing 360-degree spherical panoramas, it is important to shoot all images from exactly the same viewpoint. This is best accomplished by capturing the plurality of images at the optical center of the lens 30, effectively the no parallax point. According to Merriam Webster, "optical center" is defined as "a point on the axis of a lens that is so located that any ray of light passing through it in passing through the lens suffers no net deviation and that may be within, without, or on either surface of the lens." Four fisheye lenses 30 are disposed such that the optical center of the lens 30, its node, is 90 degrees apart from the node of the lens 30 on its right and left and is in 180-degree linear alignment with the directly opposing lens 30.

Figure 8:
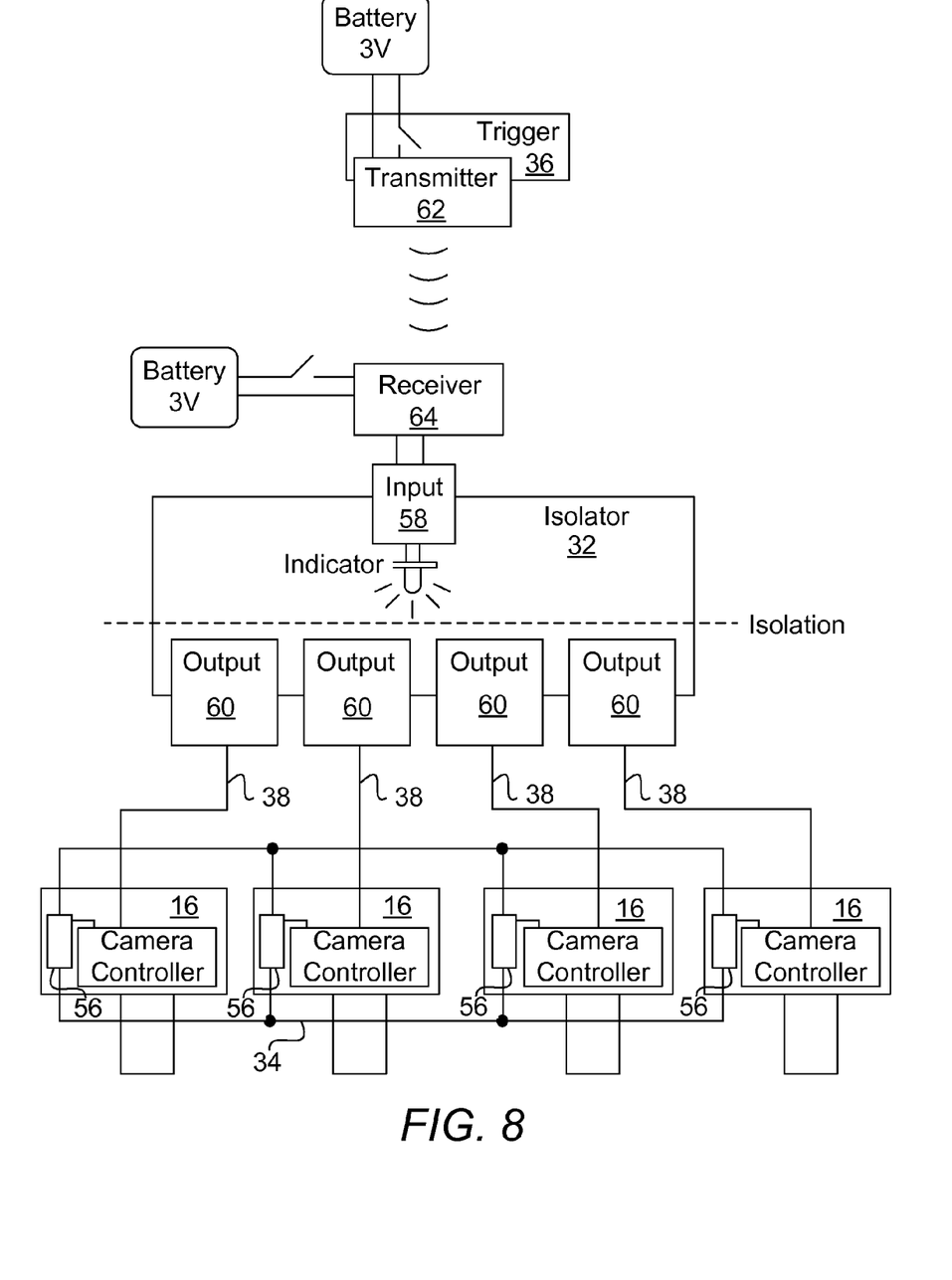
FIG. 8 is a block diagram depicting the use of a single power source to a plurality of cameras, an isolator to eliminate problems associated with unsynchronized capture of images of the plurality of cameras and a wirelessly operated trigger mechanism.

In another embodiment as shown in FIG. 8, a receiver 64 is made available to the isolator 32 for remotely and/or wirelessly receiving a trigger actuated at the electronic triggering mechanism and transmitted via transmitter 62. Suitable receivers include, but not limited to, a radio frequency (RF) receiver, an infrared (IR) receiver, a cable release, a wide fidelity (wi-fi) receiver, a POCKETWIZARD® transmitter/receiver combination and other remote electronic signaling devices. One suitable RF triggering mechanism that can be used is manufactured and sold under the trade name APUTURE. In some aspects, the RF triggering mechanism is replaced with a dual function receiver and transmitter (transceiver) to allow for two way communication between the transmitter of an RF triggering mechanism and a receiver of the isolator. The incorporation of the opto-coupler enables the single activation at the RF triggering mechanism to activate the four separate cameras simultaneously. In one embodiment, a user of the present rig is further provided the ability to make the frequency of the RF transmission unique. In this case, a Dual In-Line Package (DIP) switch is provided to enable changes in frequency at which signals are communicated from the RF triggering mechanism to the isolator 32 to accommodate interferences.

In one embodiment, the isolator itself is manually activated by the user. The isolator functions to receive a remote signal to trigger the camera, and distribute that firing command simultaneously to all four cameras. In the embodiments shown in FIGS. 7 and 8, as the isolator 32 receives via its input port 58 a signal from the triggering mechanism, an optical indicator, e.g., Light Emitting Diode (LED) lights up to signal a firing command is desired. Any number of output ports 60 may be used provided that each camera is operably connected to one output port 60. In addition, a separate and additional indicator, i.e., LED may be used to indicate that a firing command did indeed go out to each of the four cameras.

The key to the photojournalistic nature of the camera rig is the electronic trigger mechanism. The frame and camera mounting plates assure precision and repeatability of alignment of the captured images, and the electronic trigger mechanism assures that all four cameras are triggered at precisely the same time. A MUX-4 opto-coupler 32 facilitates synchronized camera triggering. The isolator 32 has one input 58 port and four isolated output ports 60. A cable harness 38 electrically connects the quad opto-coupler 32 output ports 60 at one end to four camera connectors on the other end. In one example, the Dynamic Perception MUX-4 4-Way Isolated Splitter marketed by Dynamic Perception LLC, 834 A Phoenix Dr., Ann Arbor, Mich. 48108, works well with this rig. The MUX-4 is a 4-way isolated multi-purpose splitter whose function is to safely split a dual-channel input signal into four dual-channel outputs, splitting control input to multiple cameras or a host of other control signal driven devices. This facilitates stereoscopic shooting, or synchronizing multiple views for time lapse video from a single intervalometer. The MUX-4 allows one to easily and safely split one camera control out to effectively control four different cameras, even if those devices have vastly different voltages (from 1.5V to 80V DC). True optical isolation on every port provides a means for different devices to safely react to the same control signal—allowing the user to synchronize lights, cameras, and other desired functional devices. An opto-coupler used with the present rig has one or more of the following features: complete optical isolation between all cameras and control inputs, the ability to work with isolated intervalometer outputs, and the ability to be daisy-chained (feed one output to the input of another). In one embodiment, the opto-coupler is powered by two standard AAA batteries and will last many months between changes and is formed from heavy-duty 6061 anodized aluminum construction for long-life. Other desirable features of the opto-coupler include a manual trigger option of the shutter/focus lines via pushbuttons, easy removal of the backdoor through two thumbscrews for battery replacement.

Further, timers and/or intervalometers can be incorporated in the present electronic triggering mechanism if desired to trigger firing commands periodically. Any hardware associated with the isolator 32 is preferably disposed within the center channel 6 and removably secured in any convenient fashion to the rig.

One of the challenges of this rig was to find a way to ensure that all four cameras were actuated at precisely the same moment in time. If they did not, the captured images could not be easily stitched together to form the 360-degree spherical panoramic image. This is problematic in situations where there is continuous movement such as underwater ocean scenes, trade shows, action scenes or other public areas with large crowds. Where each subsystem has its own power supply, the batteries will drain at different rates, affecting the speed at which each camera powers up to actuate the image capture sequence. When at least one of the four cameras is actuated at a different moment in time, or if one or more fails to be actuated, the resulting panoramic image is imperfect.

This challenge is solved by substituting the individual camera battery power sources into a single evenly distributed power supply source with greater power than an individual camera battery, preferably with power that is four times what is required for an individual camera. By doing so, the problems and actuation delays caused by individual weaker camera battery is overcome so all four cameras will not suffer from a delay in their initialization sequences to get the cameras ready for image capture and processing and actuating their image capture sequences. If the available power is insufficient to actuate all four cameras, no image will be captured. By combining the four individual batteries 56 into a single power source 34, there is also sufficient power to operate the remote triggering mechanism if desired.

In one embodiment, a wiring harness 38 is provided to individual power sources 56 in parallel to form a single power source 34. In another embodiment, the individual power sources are replaced with a single power source altogether. The single power source can be a battery, AC power supply, USB power source and the like. In one embodiment, a 10,000 milliamp hour Lithium Polymer (LiPo) battery is incorporated to deliver a consistent 7.4 volts to each camera over long periods of operation. The LiPo battery is rechargeable overnight when fully drained. In another embodiment, an AC power supply is used by incorporating both an appropriate adapter and four power converters to convert the AC power to 7.4 volts necessary to operate each camera. As will be readily appreciated, appropriate adapters and converters can be incorporated to accommodate a wide variety of power supplies for a variety of cameras.

Using the Panoramic Image Capture Rig

Its purpose is to shoot "single shot", high resolution 360-degree spherical panoramas. In this utilization, the term "single shot" is defined as one trigger actuation firing all four cameras simultaneously. The ideal room size for 360-degree panoramic images with this system is from about 8 feet to about 20 feet in each length, width and depth. The best results are obtained when a new image is captured at locations about 15 to 18 feet apart. In the outdoors, the image capture zone can be enlarged for distances that include many miles. As will be appreciated by those skilled in the art, the subject matter in the image will define the ideal image capture zone for the panorama. However, the best results are obtained when images are captured at about 20 foot intervals. The image exported from this system is in the form of a raw digital image.

This is intentionally an expert user piece of gear that can be used in full manual mode or full auto mode as the photographer chooses. There have been imposed no limitations on the gear such as locking-in presets in an attempt to make the product fit everybody. The present rig is not most advantageously used with a point 'n shoot system. It is presumed that the user has professional photographic experience and existing knowledge and expertise in creating 360-degree spherical photographic imagery.

This rig is ideally used for ultra fast volume documentary photography where high image quality and high resolution are desired. The image quality is balanced against the need for ultra fast and automated processing of the images captured by stitching software into panoramic images. The scene is accurately captured in real time with images of sufficient quality to identify objects and estimate distances.

The detailed description refers to the accompanying drawings that show, by way of illustration, specific aspects and embodiments in which the present disclosed embodiments may be practiced. These embodiments are described in sufficient detail to enable those skilled in the art to practice aspects of the present invention. Other embodiments may be utilized, and changes may be made without departing from the scope of the disclosed embodiments. The various embodiments can be combined with one or more other embodiments to form new embodiments. The detailed description is, therefore, not to be taken in a limiting sense, and the scope of the present invention is defined only by the appended claims, with the full scope of equivalents to which they may be entitled. It will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description. The scope of the present disclosed embodiments includes any other applications in which embodiments of the above structures and fabrication methods are used. The scope of the embodiments should be determined with reference to the appended claims, along with the full scope of equivalents to which such claims are entitled.

What is claimed herein is:

1. A spherical image camera rig consisting of four rectangularly disposed receptacles, wherein each said receptacle is configured to receive a camera having a fisheye lens disposed thereon, two of said four receptacles are configured to receive two cameras in a first 180-degree linear alignment with directly opposing lenses, the other two of which are configured to receive two cameras in a second 180-degree linear alignment with directly opposing lenses, said second 180-degree linear alignment is configured to intersect perpendicularly with said first 180-degree linear alignment.

2. A spherical image camera rig comprising four rectangularly disposed receptacles, wherein each said receptacle is configured to receive a camera having a fisheye lens disposed thereon, two of said four receptacles are configured to receive two cameras in a first 180-degree linear alignment with directly opposing lenses, the other two of which are configured to receive two cameras in a second 180-degree linear alignment with directly opposing lenses, said second 180-degree linear alignment is configured to intersect perpendicularly with said first 180-degree linear alignment and each said receptacle comprises a planar surface comprising a plurality of first apertures; a U-shaped member comprising a first adjustment slot within which a screw mechanism is disposed, wherein said first adjustment slot is configured for adjustment of said screw mechanism in securing a camera; and a plurality of second adjustment slots configured for receiving screws which thread through said plurality of first apertures for securing said U-shaped member to said planar surface.

3. The spherical image camera rig of claim 2, wherein each of the plurality of fisheye lenses possesses vertical, horizontal and diagonal angles of view of at least about 180 degrees.

4. The spherical image camera rig of claim 2, further comprising a single power source operably connected to the cameras.

5. The spherical image camera rig of claim 4, wherein said single power source comprises a battery.

6. The spherical image camera rig of claim 2, further comprising a harness for connecting the power source of each of the cameras in parallel.

7. The spherical image camera rig of claim 2, further comprising a plurality of isolated triggers, each trigger is functionally connected to one of the cameras.

8. The spherical image camera rig of claim 7, wherein said plurality of isolated triggers is a device selected from a group consisting of an opto-coupler and an opti-coupler.

9. The spherical image camera rig of claim 2, further comprising a remote triggering mechanism configured to trigger image capture of the cameras.

10. The spherical image camera rig of claim 9, wherein said remote triggering mechanism is a wireless triggering device.

11. The spherical image camera rig of claim 2, further comprising a triggering mechanism configured for triggering image capture of the cameras at precisely the same moment.

12. The spherical image camera rig of claim 2, said four rectangularly disposed receptacles are sized such that the distance between the nodes of two cameras disposed in a 180-degree linear alignment with directly opposing lenses is no more than about 10 inches.

13. The spherical image camera rig of claim 2, said four rectangularly disposed receptacles are sized such that the distance between the nodes of two cameras disposed in a 180-degree linear alignment with directly opposing lenses is no more than about 4 inches.

14. A spherical image camera rig comprising:
(a) four rectangularly disposed receptacles, wherein each said receptacle is configured to receive a camera having a fisheye lens disposed thereon, two of said four receptacles are configured to receive two cameras in a first 180-degree linear alignment with directly opposing lenses, the other two of which are configured to receive two cameras in a second 180-degree linear alignment with directly opposing lenses, said second 180-degree linear alignment is configured to intersect perpendicularly with said first 180-degree linear alignment; and
(b) a plurality of isolated triggers, each trigger is functionally connected to one of the cameras.

15. The spherical image camera rig of claim 14, wherein said plurality of isolated triggers is a device selected from a group consisting of an opto-coupler and an opti-coupler.

16. The spherical image camera rig of claim 14, further comprising a single power source operably connected to the cameras.

17. The spherical image camera rig of claim 14, further comprising a harness for connecting the power source of each of the cameras in parallel.

18. The spherical image camera rig of claim 14, further comprising a triggering mechanism configured for triggering image capture of the cameras at precisely the same moment.

* * * * *